United States Patent [19]

Briggs et al.

[11] 4,421,815

[45] Dec. 20, 1983

[54] FIBROUS COMPOSITE MATERIALS AND THE PRODUCTION AND USE THEREOF

[75] Inventors: Peter J. Briggs, Cheadle Hume; Kevin McAloon, Appleton Thorn, both of England

[73] Assignee: Imperial Chemical Industries PLC, London, England

[21] Appl. No.: 281,106

[22] Filed: Jul. 7, 1981

[30] Foreign Application Priority Data

Jul. 11, 1980 [GB] United Kingdom ................ 8022713

[51] Int. Cl.³ .................... B32B 27/14; B32B 7/02; D21D 3/00
[52] U.S. Cl. .................................... 428/198; 428/220; 428/283; 428/288; 428/920; 162/181.6
[58] Field of Search ............... 428/283, 288, 402, 920, 428/338, 198, 220; 106/18.11; 162/3, 156, 181.4, 181.5, 181.6, 181.8, 157 R

[56] References Cited

U.S. PATENT DOCUMENTS

| 3,434,917 | 3/1967 | Kraus et al. | 162/3 |
| 3,540,892 | 11/1970 | Lard et al. | 106/18.11 |
| 4,269,628 | 5/1981 | Ballard et al. | 428/720 |
| 4,366,203 | 12/1982 | Briggs | 428/319.1 |
| 4,366,204 | 12/1982 | Briggs | 428/319.1 |

FOREIGN PATENT DOCUMENTS 1404001 8/1975 United Kingdom .
1498966 1/1978 United Kingdom .

*Primary Examiner*—George F. Lesmes
*Assistant Examiner*—Beverly K. Johnson
*Attorney, Agent, or Firm*—Cushman, Darby & Cushman

[57] ABSTRACT

A fibrous composite material in the form of a three-dimensional block comprising a mass of combustible fibres and lamellae of a layer mineral, a method for the manufacture of the fibrous composite materials by applying lamellae of a layer mineral, preferably from a suspension, to combustible fibres and forming the fibres and layer mineral into a three-dimensional block, and use of the fibrous composite materials as insulating materials and for the fire protection of substrates.

17 Claims, No Drawings

FIBROUS COMPOSITE MATERIALS AND THE PRODUCTION AND USE THEREOF

This invention relates to fibrous materials and particularly to fibrous composite materials comprising fibres which have been coated with or embedded in an inorganic material to upgrade the fibres, and to the production and use of the fibrous composite materials. Fibres and fibrous materials made from them are notoriously susceptible to damage or destruction by fire. Fibres, whether natural or man-made fibres, comprising organic materials, for example wool, cotton, rayon, cellulose acetate, polyesters polyamides and lignocellulosic fibres are generally combustible and readily flammable. The fibres offer little if any resistance to the spread of a fire and are not flame-retardant. It would clearly be advantageous, for example, in the textile, furnishing and building industries, if fibres and particularly the less expensive organic fibre, could be upgraded to improve their fire performance, e.g. fire resistance and flame retardancy, and numerous treatments have been proposed for achieving this desirable result by coating the fibres with or embedding them within a fire-resistant material or by incorporating a fire-resistant material in the fibre structure. Hitherto, no satisfactory solution to the problem has been achieved; in particular no solution has been found which combines satisfactory fire performance of combustible fibres with acceptable expense whilst retaining the flexible nature of the fibres and materials made from them.

According to the present invention there is provided a fibrous composite material in the form of a three-dimensional block comprising a mass of fibres and lamellae of a layer mineral.

There is also provided according to the invention a method for the manufacture of a composite material in the form of a block which comprises applying lamellae of a layer mineral to combustible fibres, preferably from suspension in an inert carrier liquid, and forming the fibres and lamellae into a three dimensional block such that the fibres are coated with the lamellae and are bonded together by the lamellae at their points of contact.

The method for the manufacture of the composite material is also a method of rendering flammable fibres in the form of a block fire-resistant and of upgrading the fire-performance of the block.

Vermiculite is the preferred layer mineral. By "vermiculite" we mean all materials known mineralogically and commercially as vermiculite, including the chlorite-vermiculites.

By the term "lamellae of a layer mineral" as used throughout this specifiction we mean tiny particles of the layer mineral obtained by chemically delaminting the layer mineral into particles or platelets having a high aspect ratio. Thus for example vermiculite lamellae obtained by chemical delamination are tiny platelets obtained by chemical delamination of vermiculite and having a thickness of less than 0.5 micron, usually less than 0.05 micron and preferably less than 0.005 micron, and having an aspect ratio (i.e. length or breadth divided by thickness) of at least 10, preferably at least 100 and more preferably at least 1000, for example 10,000. The lamellae obtained by chemical delamination of other layer minerals are of similar dimensions to those of vermiculite lamellae.

Whilst vermiculite is the prefered layer mineral, other layer minerals which may be used include montmorillonite, Kaolinite (and clays comprising Kaolinite, for example kaolins and ball clays), sepiolite and other layer-silicate minerals which can be chemically deliminated to provide lamellae or plate-like particles.

The fibrous composite materials of the invention are in the form of a three dimensional block, by which term is meant a three-dimensional structure of appreciable thickness in contrast to individual fibres or sheet forms of fibrous matrials which are essentially two-dimensional structures.

In the block the fibres may be individual fibres or clusters of fibres and are generally randomly oriented, although it is to be understood that a degree of orientation of the fibres is not excluded.

It is to be understood that in the fibrous composite block the fibres may be continuous (filamentary) or discontinuous (staple), or clusters or agglomerates of fibres such as wood pulp, strands, rovings, wood chips, shavings and sawdust.

The amount by weight of lamellae applied to the fibrous material may vary within wide limits depending for example upon the intended fire/temperature duty of the composite and the required degree of structural integrity of the composite block before and after it has been subjected to a fire. In general, increasing the loading of lamellae on the fibrous material will increase the fire-performance of the block and the thermal conditions which the block will withstand. We have observed, however, that in general very thin coating layers of lamellae, for example less than 1 micron thickness, on the fibres of the block or on the clusters of fibres in the block are all that is required to upgrade the fire-performance and the high-temperature performance of the fibres. As a guide only, the loading of lamellae in the composite block will usually be from 0.05% to 100% by weight of the fibres, typically from 0.1% to 20% by weight. Amounts of lamellae greater than these may be used and indeed the composite may comprise as much or even more lamallae than fibres; the amount of fibers in such a structure should, however, be at least 15%, preferably at best 20% by weight of the composite block.

The amount of lamellae applied to the fibres will affect to some extent the degree of damage suffered by the fibres when the composite material is exposed to a flame or to temperatures above the melting point of the fibres. Fibres coated only very thinly with lamellae may be charred or even completely burned by naked flames whilst increasing the thickness of the coating increases the resistance to damage of the fibres by the flame. Likewise, meltable fibres coated thinly may be melted by a flame or high temperature whilst increasing the coating thickness increases the resistance of the fibres to melting. In most practical applications of the invention the fibres of the composite block are likely to be damaged or even completely burned or melted by a flame or high temperatures especially at the surface of the block. Neverless, in spite of this, the insulation properties and fire-performance of the composite material are not seriously impaired, especially the fire-barrier and flame-retardant properties of the composite material.

The fibrous composite materials are made by applying the lamellae to the fibres or clusters of fibres and forming the mixed fibres and lamellae into a block. Usually the lamellae will be aplied from a suspension in a carrier liquid which may be for example an organic liquid, or water or another aqueous medium. Conveniently the suspension obtained in the process used for chemical delamination of layer minerals can be used directly to form the fibrous composite material. If desired, however, lamellae in the form of a free-flowing dry powder (as described for example in our European Patent Publication No. 0009.311A) may be suspended in any suitable carrier liquid for application to the fibrous substrate. The solids content (lamellae) of the suspension is not critical and may vary over a wide range; any stable suspension may be employed. Typically, the solids content of the suspension will be up to 40% by weight of the suspension but may for the production of very thin coatings on the fibres of the block be only a few %, say 2% by weight. Preferably the solids content of the suspension for most applications will be from 10% to 40% by weight.

After application of the suspension to the fibrous mass, the mass is moulded and the carrier liquid of the suspension used to apply the layer material is removed, usually by evaporation, to leave the lamellae deposited, preferably as a coherent layer, on the fibrous substrate. If desired excess carrier liquid may be allowed to drain from the composite material prior to heating the composite material to remove residual carrier liquid. The temperature at which the suspension is applied to the fibrous substrate can be any temperature up to the boiling point of the carrier liquid, providing of course that the fibres are stable at such temperatures.

The suspension (or slurry as it may also be termed) can be applied to the fibrous substrate by any known technique, including brushing (painting), spraying, doctoring, licking, knife-coating, 'nip'-coating, roller-coating, dip-coating and impregnation. It is a simple matter for the operator to choose a suspension strength and an application techinique appropriate to applying the desired loading of lamellae onto the fibrous substrate.

If desired, the suspension of lamellae (in the case of vermiculite lamellae) in the case of may be gasified to produce a froth for application to the fibrous substrate so that the vermiculite content of the resulting composite material may be present as a cellular (rigid foam) matrix. Conversion of a suspension of vermiculite lamellae to rigid foams is described, for example, in our United Kingdom Patent Specification No. 1,585,104. A preferred technique for making blocks from loose fibres comprises forming a dough-like suspension of the fibres and the layer mineral and moulding the dough into the form of a block. In such a case the suspension of fibres may include the lamellae by suspending the fibres in a suspension of lamellae, by suspending lamellae in a suspension of fibres or by mixing suspensions of fibres and lamellae. In this techique, a small amount of an organic binder, for example a rubber latex of polymer latex may be included in the suspension to afford handleability to the resulting mat.

The fibrous composite blocks of the invention exhibit improved fire-performance and high temperature performance compared with the corresponding material made of the untreated fibres. Thus fibres which are inherently flammable can be rendered fire-resistant and flame-retardant whilst organic fibres which melt at low temperatures can be upgraded to higher temperature performance. It is a general feature of the invention that the first-performance and thermal properties of block made from combustible fibres are upgraded by the incorporation in them of the lamellae of a layer mineral.

As stated hereinbefore, vermiculite is the preferred layer material. The reason for this preference is that in addition to conferring good fire resistance and thermal performance to the fibrous composite materials, vermiculite almost alone among the layer minerals exhibits excellent self-adhesion properties. Upon removal of the water (or other carrier liquid) from suspensions of vermiculite lamellae, the lamellae adhere together to form a relatively strong layer of vermiculite and fibrous composite materials containing vermiculite lamellae benefit from this self-adhesion characteristic of the applied lamellae in that the strength and durability of the composite is improved. The deposited vermiculite lamellae act as an adhesive to bond the fibres or clusters of fibres of the fibrous mass together and/or to bond the composite to other materials for example to form laminates.

Another advantage afforded by coating the fibres of the block with lamellae is that the fibres are rendered flame-retardant. However flame does tend to spread over the surface of the lamellae coating and if desired there may be incorporated in the composite material flame-retardant additives such as halogenated compounds, antimony trioxide aluminium trihydrate, borates and phosphates. Thus for example flames can be inhibited from spreading over the composite material even though the fibres actually contacted by the flame may be burnt or melted within the composite material. A still further advantage afforded by coating fibres with lamellae is that the coating is chemically inert and in particular is acid and alkali resistant. Thus fibres which are not normally useable in alkaline environments can be rendered suitable for such use.

The fibrous composite blocks described hereinbefore and comprising umodified coatings comprising lamellae of a layer mineral are useful materials for a wide variety of applications. However, in applications where the composite material is liable to be subjected to liquid water, it is preferred to modify the coatings to confer improved water-stability upon the composite. Unmodified coatings tend to disintegrate in liquid water; however, they are readily modified to make them stable in liquid water. Composite materials comprising vermiculite lamellae can be made water stable by treatment with a solution, for example a saturated solution, of a magnesium salt such as magnesium chloride at elevated temperature or by incorporating a water-stability improver in the suspension of lamellae applied to the fibrous substrate, as is described, for example, in our European Patent Publication No. 0.009.310 A1. Suitable water-stability improvers are particulate compounds sparingly soluble in water and having a basic reaction in water, for example calcium oxide and magnesium oxide.

Magnesium oxide is the preferred water-stability improver and in addition to conferring water-stability to the composite, this additive enhances the strength of the composite. Magnesium oxide is a particularly desirable additive to gasified (frothed) vermiculite suspensions used to form the composite material in that it additionally enhances the compressive strength of the cellular vermiculite matrix of the composite material. The amount of water-stability improver will usually be up to 15% by weight, typically 10%, based on the lamellae.

Water-proofing of the composite materials, as opposed to improving their stability in liquid water, can be effected by incorporating a silicone polymer precursor in the suspension of lamellae prior to or during application of the suspension to the fibrous material, and treating the composite material with an acidic gas in the presence of water to polymerize the precursor and form a silicone polymer in the composite material. Such a water-proofing process is described in out co-pending United Kingdom patent application No. 8103459. Thus, for example, sodium methyl siliconate can be incorporated in the suspension and the resulting composite material treated with carbon dioxide in the presence of water (during drying of the composite material or subsequent to drying the composite and re-wetting it). The amount of silicone polymer precursor added to the suspension will usually be up to about 5% by weight, typically about 2% by weight, based on the lamellae.

Any suspension of lamellae of layer minerals may be used to form the composite materials of the invention. Chemical delamination of layer minerals is well known and any of the known chemical delamination processes may be employed, including the processes described for delaminating vermiculite in United Kingdom Patent Specifications Nos. 1,016,385; 1,076,786; 1,119,305; and 1,585,104 and by Baumeister and Hahn in "Micron" 7 247 (1976). After production of the suspension of lamellae, the suspension of chemically delaminated layer mineral is preferably subjected to a wet-classification treatment in which larger particles of the mineral are removed, as is described in respect of suspensions of vermiculite lamellae in our United Kingdom patent application Nos. 39510/76:51425/76 and German OLS No. 2.741.859. For use in the process of the present invention, the suspension preferably is wet-classified to a particle size (platelets) below 50 microns, so that the suspension exhibits colloidal properties. Typical suspensions of vermiculite lamellae obtained by the process described in United Kindom Patent Specification No. 1,585,104 wet-classified to particles of below 50 microns comprise about 40% of particles in the size range 0.4 to 5.0 microns.

Such suspensions are the preferred suspensions for making the fibrous composite materials of the present invention. The fibrous composite blocks of the invention can be used in any applications where fibrous blocks are commonly employed, and additionally they enable particular fibres to be used in numerous applications where hitherto those fibres have been considered unusable because they exhibit unsatisfactory fire performance, for example they are flammable and/or low melting fibres.

Included amongst the many uses of the fibrous composite material of the invention are heat and sound insulation applications and the fire-protection of flammable and/or low-melting materials such as rubber and plastic foams, sheets and films, aluminium, wood, paper, cardboard, glass, and the like and the protection of metals and cementitious materials. For such uses, the fibrous composite material may be provided as a loose covering not bonded to the substrate but we have found that best results are obtained if the composite is bonded to and laminated with the substrate. The composite may be laminated with the substrate using conventional adhesive although in most cases where the layer mineral is vermiculite, the adhesive nature of vermiculite lamellae deposited from suspension enables another adhesive to be dispensed with. Thus for example application of the wet composite (i.e. the fibrous mass plus vermiculite suspension) will often result in the satisfactory bonding of the composite to the substrate. Alternatively, the composite may be formed in situ on the substrate to be protected.

The composite material if desired contain other substances, e.g. sizes, lubricants and binders on the fibres, or fire-retardant agents or fillers.

The fibrous composite materials are also useful in applications which do not require fire-retardance and good thermal properties, for example as reinforcement layers for organic and inorganic materials, e.g. polymers, rubbers, plastics and cements. Uses involving reinforcement of organic materials with fibres include GRP (glass reinforced plastics).

The invention is illustrated but in no way limited by the following Examples in which the following general procedure was used to prepare the vermiculite suspensions.

Preparation of Vermiculite Suspensions 150 parts of vermiculite ore (Mandoval micron grade, ex-South Africa) are agitated with saturated sodium chloride solution in 1:2 ratio by weight in a tank for 30 minutes at 80° C. This suspension is then centrifuged and washed with deionised water. The wet cake is transferred to a second tank where the vermiculite is stirred with 1.5 N n-butylamine hydrochloride (2:1 liquid:solid ratio) for 30 minutes at 80° C. This suspension is then centrifuged and washed with deionised water before transferring the wet cake to a swelling tank in which the vermiculite is stirred in deionised water. After swelling, the suspension contains approximately 20% solids and the particles random sized in the range 300–400 micron. This suspension is then passed through a stone-type mill which reduces approximately 50% of the particles to platelets of size less than 50 microns. This milled suspension is classified in a weir-type centrifugal classifier and the lighter particles with sieve size less than 50 micron are collected for use. Analysis of this 18–21% solids suspension by photosedimentometer and disc centrifuge reveals that approximately 40% of the particles have a size ("equivalent spherical diameter") of 0.4–0.1 micron. The solids content of the suspension is readily adjusted by adding water to it or removing water from it.

EXAMPLE 1

Beech wood chips (approx size 12 mm×2-5 mm×0.5 mm) were soaked in 4% by weight vermiculite suspension, excess water (and suspension) decanted off and the chips were air-dried for 48 hours. These treated chips were pressed at 70 kg/cm² for 20 minutes at 175° C. to form a well bonded sample block of chipboard. A control sample of chipboard was also made using the same beech chips and emulsifiable MDI binder.

15 mm×15 mm×3 mm samples of the chipboards were then heated on steel dishes at 1075° C. Both treated and untreated sample ignited at 18 seconds. After 12 minutes the untreated chipboard hand shrunk to a small heap of white powder whereas the vermiculite-treated chipboard had turned grey and partially curled upwards but remained intact. The significant difference was that in the treated chipboard the structure of the individual beech chips was still intact and protected by the thin layer of vermiculite coating them.

EXAMPLE 2

Cellulose fibres in the form of chopped mat of size approximately 0.6 cm square was dried and then dry-dispersed in a domestic liquidiser.

A suspension of vermiculite lamellae, wet-classified to below 50 microns (523.9 g of 19% by weight suspension; 101.25 g vermiculite) was mixed with deionised water (246 g) and a surface active agent, Forafac (0.5 g) in a Kenwood Chef mixer fitted with whisk attachment, at speed setting 4 for 20 minutes. The whisk attachment was then replaced by a dough-making attachment and the dispersed cellulose fibres (101.25 g) were mixed into the suspension over a period of 25 minutes at speed setting 4. A 10% by weight slurry of magnesium oxide powder (10.1 g) in water was then added to the suspension and mixed into the suspension for 30 seconds after which time the suspension was immediately cast into a mould of dimensions approximately 15 cm × 15 cm × 5 cm. After 30 minutes the resulting fibrous block was demoulded and dried in an oven at 80° C. overnight. The dry block had a density of 205.4 Kg/m³.

The dry block was placed directly in the flame from a bunsen burner. Smoke emission was observed but the block did not burn and there was no sign of burn through after 3 minutes. The sample was removed from the flame after 3 minutes and it was observed that some charring of the fibres at the exposed surface of the block had occurred, although the block retained its integrity.

For purposes of comparison a fibrous block was made by dispersing a sample of the same cellulose fibres (69 g) in water (949 g) and costing the suspension in the same mould, allowing free drainage of water. After drying overnight the block was placed in a bunsen burner flame. The block ignited at once and burned easily and rapidly until it was completely destroyed by the flame.

EXAMPLE 3

Using the procedure described in Example 2 except that the whisk attachment to the mixer was exployed for mixing in the cellulose fibres and fibre addition was over a period of 6 minutes instead of 25 minutes, a fibrous block was made:

| | |
|---|---|
| Cellulose fibres* (Hardwood) | 40.5 g |
| Suspension of vermiculite lamellae | 853 g |
| | (162.5 g vermiculite) |
| Forafac (surface active agent) | 0.5 g |
| Water | 264 g |
| Magnesium oxide | 16.2 g |

*The cellulose was prepared by dispersing it in 1 liter of water in a domestic liquidiser followed by drainage of free water. The cellulose fibre used to form the block contained 129 g residual water.

After demoulding, the block was dried at 130° C. for 30 minutes, followed by heating in a microwave over for 5 minutes, then by heating at 120° C. overnight.

The dry block was of density 119 Kg/m³ and its K-factor was determined as 0.059 W/MK.

A block prepared similarly but dried at 70° C. for 48 hours had a density of 129 Kg/m³.

EXAMPLE 4

A fibrous block was made from the following components using the procedure described in Example 2 except that the whisk attachment for the mixer was used to mix in the fibres over a period of 20 minutes and the mixture was mixed for 1 minute after addition of the magnesium oxide slurry:

| | |
|---|---|
| Cellulose fibres* | (40.5 g) |
| Vermiculite suspension | (162 g vermiculite - 15% suspension) |
| Forafac | (0.225 g) |
| Water | (393 g) |
| Magnesium oxide slurry | (16.2 g in 162 g water) |

*The cellulose fibres were prepared by soaking cellulose in water for 2 days, followed by dispersion in 2 liters of water in a liquidiser, dewatering of the dispersion and drying of the fibres.

The demoulded block was dried at 80° C. overnight to yield a dry block of density 140 Kg/m³ having a K-factor of 0.063 W/MK.

The above procedure was repeated except that the fibres were mixed into the suspension over a period of 25 minutes. The dry block was of 140 Kg/m³ density.

EXAMPLE 5

Sawdust (120 g) was added to a 19% suspension of vermiculite lamellae in water (316 g of suspension) and the mixture was whisked in a Kenwood Chef mixer for 5 minutes, then cast into a mould of dimensions approximately 15 cm × 15 cm × 5 cm and dried in the mould overnight at 100° C. The block had a density of 352 kg/m³.

A second block was made as above using 90 g of sawdust instead of 120 g. The density of the dry block was 332 Kg/m³.

The blocks were placed in the flame of a bunsen burner. In each case the sawdust at the surface of the block contacted by the flame was observed to burn although the rate of burning was slow compared with a block of compressed sawdust and surface spread of flame was slow. Even though the sawdust was burned, the block retained its integrity in the flame.

EXAMPLE 6

The procedure described in Example 2 was repeated except that the suspension of vermiculite lamellae was not wet-classified before use by removal of particles of size greater than 50 microns but was instead simply adjusted to 19% by weight solids content.

The dry block had a density of 250 Kg/m³. The performance of the block in a bunsen burner flame was similar to that of the block described in Example 2.

We claim:

1. A fibrous composite material in the form of a three-dimensional block comprising a nonwoven mass of combustible fibers and vermiculite lamellae obtained by chemical delamination of vermiculite and having a thickness of less than 0.5 micron, the fibers comprising at least 15% by weight of the block and being bonded together by the vermiculite at their points of contact.

2. A material as claimed in claim 1 wherein the amount of the fibres is at least 20% by weight of the block.

3. A material as claimed in claim 1 wherein the amount of vermiculite is at least 20% by weight of the block.

4. A material as claimed in claim 1, 2, or 3 wherein the fibres are cellulose fibres.

5. A material as claimed in claim 1 wherein the mass of fibers comprises individual fibers.

6. A material as claimed in claim 1 wherein the mass of fibers comprises clusters or agglomerates of fibers.

7. A material as claimed in claim 6 wherein the clusters or agglomerates of fibres are wood chips.

8. A material as claimed in claim 6 wherein the clusters or agglomerates of fibres are wood sawdust.

9. A material as claimed in claim 3 wherein the amount of vermiculite is up to 100% by weight of the fibres 10. A material as claimed in claim 1 which additionally comprises a water stability improver.

11. A material as claimed in claim 10 wherein the water stability improver is magnesium oxide.

12. A method for the manufacture of a fibrous composite material in the form of a three-dimensional block which comprises applying a suspension of vermiculite lamellae, obtained by chemical delamination of vermiculite and having a thickness of less than 0.5 micron, to a nonwoven mass of combustible fibers and forming the fibers and lamellae into a three-dimensional block such that the fibers are coated with the lamellae and are bonded together by the vermiculite lamellae at their points of contact.

13. A method as claimed in claim 12 wherein the suspension is an aqueous suspension.

14. A method as claimed in claim 12 or 13 which comprises forming a suspension of the combustible fibers and vermiculite lamellae and forming the suspension into the block.

15. A method as claimed in claim 12 wherein the suspension is gasified before the suspension is formed into a block.

16. An insulating material formed of the fibrous composite material as claimed in claim 1.

17. A fire-resistant composite laminate comprising a substrate layer and the fibrous material layer as claimed in claim 1.

* * * * *